May 8, 1956 L. C. BEARER 2,744,732
PEBBLE HEAT EXCHANGE CHAMBER
Filed Sept. 12, 1952 3 Sheets-Sheet 1

INVENTOR.
L. C. BEARER
BY *Hudson and Young*
ATTORNEYS

INVENTOR.
L.C. BEARER
BY Hudson and Young
ATTORNEYS

May 8, 1956　　　L. C. BEARER　　　2,744,732
PEBBLE HEAT EXCHANGE CHAMBER

Filed Sept. 12, 1952　　　3 Sheets-Sheet 3

INVENTOR.
L. C. BEARER
BY Hudson and Young
ATTORNEYS

United States Patent Office 2,744,732
Patented May 8, 1956

2,744,732

PEBBLE HEAT EXCHANGE CHAMBER

Louis C. Bearer, Bartlesville, Okla., assignor to Phillips Petroleum Company, a corporation of Delaware Application September 12, 1952, Serial No. 309,253

10 Claims. (Cl. 257—55)

This invention relates to pebble heater apparatus. In one of its more specific aspects, it relates to improved pebble heat exchange chambers of pebble heater apparatus. In another of its more specific aspects, it relates to means for regulating pebble flow through pebble heat exchange chambers. In another of its more specific aspects, it relates to a method of obtaining more nearly equal pebble-gas contact time through pebble heater and reactor chambers.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross-section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about 1/8 inch to about one inch in diameter. In a high temperature process, pebbles having a diameter of between 1/4 inch to 3/8 inch are preferred. The pebbles must be formed of refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used as admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 50° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are desirable.

One disadvantage of conventional pebble chambers in which a plurality of pebble inlets is distributed about the periphery of the chamber at its upper end, is that beneath each pebble inlet, a vertical zone of pebbles will exist which is deeper than a zone intermediate the pebble inlets. Valleys are formed in the top of the pebble bed within the pebble chamber between the pebble inlet conduits. This results in the formation of vertical zones intermediate the pebble inlet conduits which are of lesser depth than the vertical zone immediately below each of the pebble inlet conduits. Less gas will flow through the vertical zone below each pebble inlet because of the greater pebble depth at that point. Gas tends to take a path of least resistance, and for that reason considerable gas flows into the vertical zones intermediate the pebble inlet conduits. This invention is particularly adapted to a reactor chamber wherein a plurality of pebble inlets, such as described above, are utilized and a central pebble outlet is used.

Each feed to a reactor chamber of a pebble heater apparatus has different characteristics. In particular, these characteristics cause different temperature gradients across the surface of the pebble bed within the reactor. This is the case regardless of whether multiple inlets or a single pebble inlet are provided in the reactor. Thus, a reactor which is designed to crack normal butane (with a heat of reaction of about 850 B. t. u./pound) will have a smaller temperature gradient across the top of the bed than the same reactor will have when it is converted to crack ethane (with a heat of reaction of about 2100 B. t. u./pound).

The same reactor will thus necessarily have to be modified somewhat in order to obtain the most efficient cracking of both feeds. It should also be noted that any reactor which is designed and placed in operation for the first time will also require some adjustment to bring about the most efficient operation thereof. My invention makes possible the modification of such pebble heat exchange chambers in a rapid and feasible manner.

Each of the following objects will be obtained by at least one of the various aspects of this invention.

An object of this invention is to provide improved means for thermally treating or cracking gaseous materials. Another object of the invention is to provide improved means for controlling the pebble flow through pebble heater apparatus. Another object of the invention is to provide means for controlling the flow of pebbles through a pebble heat exchange chamber so as to cause the greatest amount of pebbles to flow through those vertical zones through which the greatest portion of gaseous material flows. Another object of the invention is to provide means for diverting pebbles from the vertical zones immediately below the pebble inlet conduits. Another object of the invention is to provide a method for obtaining more uniform cracking of hydrocarbon materials in a pebble reactor chamber. Other and further objects of the invention will be apparent upon study of the accompanying disclosure.

Broadly speaking, this invention resides in the improvement in pebble heat exchange chambers which comprises a baffle intermediate the axis of the chamber and the axis of each pebble inlet conduit to that chamber. These baffles are installed in the lower end portion of the chamber and each baffle is of a width corresponding roughly to the formula $$\frac{C}{2n}$$

where "C" is the circumference of an imaginary circle upon which the baffles are positioned and "$n$" is the number of throats. The upper edge of the baffles, which are movable vertically, may be in the form of an arc or may roughly correspond to the shape of the top of the pebble bed portion above that baffle.

Better understanding of this invention will be apparent upon study of the diagrammatic drawings in which.

Figure 1:
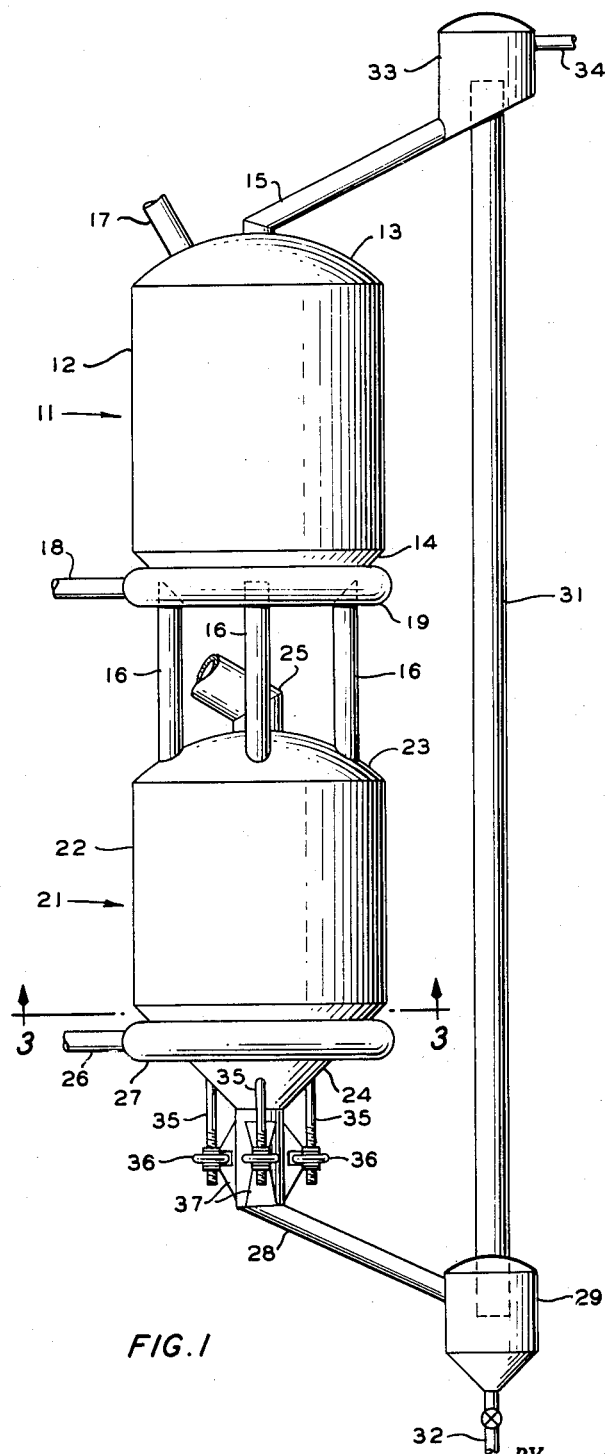
Figure 1 is a schematic view of a pebble heater apparatus embodying a pebble heat exchange chamber of this invention.

Referring particularly to the device shown in Figure 1 of the drawings, pebble heat exchange chamber 11 comprises upright, elongated shell 12 closed at its upper and lower ends by closure members 13 and 14, respectively. Pebble inlet conduit 15 is provided in the upper end portion of shell 12, preferably centrally positioned in closure member 13 and pebble outlet conduits 16 are provided in the lower end of closure member 14, preferably extending downwardly from the periphery of chamber 11. Gaseous effluent outlet conduit 17 is provided in the upper end portion of shell 12, preferably in closure member 13, and gaseous material inlet conduit 18 is connected to and communicates with the lower end of the chamber formed within shell 12 by means of header member 19.

Pebble heat exchange chamber 21 comprises upright, elongated shell 22, closed at its upper and lower ends by closure members 23 and 24, respectively. Pebble conduits 16 are connected to the upper end portion of chamber 21, preferably at or adjacent to its periphery and preferably through closure member 23. Gaseous effluent conduit 25 extends upwardly from the upper end of chamber 21 and, in the specific device shown in Figure 1, preferably extends centrally through closure member 23. Gaseous material inlet conduit 26 is connected to the lower end of the chamber formed within the shell 22 through header member 27. Pebble outlet conduit 28 extends downwardly from the lower end of chamber 21 and is connected at its lower end portion to pebble entrainer chamber 29 which encircles the lower end portion of elevator conduit 31. Lift gas inlet conduit 32 is connected to the lower end portion of chamber 29. Pebble-gas separator chamber 33 surrounds the upper end portion of elevator conduit 31, having gaseous effluent conduit 34 disposed in its upper end portion and being connected at its lower end portion to the upper end of pebble inlet conduit 15. Baffle drive members 35 extend upwardly into the lower end of chamber 21 and are provided with actuator members, such as drive wheels 36 which are threadedly connected with drive members 35 and are spaced from the lower end of chamber 21 by means of positioning members 37. The baffles which are connected to drive members 35 are more fully described below in the discussion of the device shown in Figure 2 of the drawings.

This invention may be used in connection with either the pebble heater chamber or the reactor chamber. The invention is shown in Figure 1 as being provided in the reactor chamber and in Figure 2 as being provided in the pebble heater chamber. The specific detail of the baffles shown in Figures 2, 3, 4A, B and C can also be used in connection with chamber 21 of Figure 1.

In the operation of the device shown in Figure 1 of the drawings, pebbles are introduced into the upper end portion of chamber 11 through inlet conduit 15 and form a contiguous gravitating pebble mass within that chamber. Gaseous heating material is introduced into the lower portion of chamber 11 through inlet conduit 18 and header member 19. The gaseous heating material may be in the form of preheated gaseous materials or may be in the form of fuel and air which are burned in the lower portion of chamber 11, forming hot combustion gases at a temperature at least as high as that desired for the reaction or heating to be carried out in the lower chamber. The hot gaseous heat exchange material flows upwardly through the contiguous gravitating pebble mass in direct heat exchange therewith, raising the temperature of those pebbles to at least the temperature desired for the lower chamber. Gaseous effluent is removed from the upper end of chamber 11 through gaseous effluent outlet conduit 17.

Pebbles which are heated within chamber 11 are gravitated from the lower end of that chamber through pebble conduits 16 into the upper end portion of chamber 21, forming a contiguous gravitating pebble mass within that chamber. The baffles which are positioned within the lower end of chamber 21 are positioned so as to restrict the pebble flow from the vertical zone directly below each pebble throat. This restriction of the pebble flow from the vertical zone directly below the pebble throat retards the flow of pebbles through that zone and increases the flow of pebbles through the vertical zones intermediate the pebble throats. Gaseous material is introduced into the lower portion of chamber 21 through inlet conduit 26 and header member 27. The gaseous material flows upwardly through the contiguous gravitating pebble mass within chamber 21 in direct heat exchange with those pebbles. As pointed out above, the gaseous material tends to take a path of least resistance through a gravitating pebble mass. The path of least resistance through the pebble mass within chamber 21 is found in the vertical zones intermediate those zones below the pebble throats. Restriction of pebble flow in the manner discussed above so as to cause greater amounts of pebbles to flow through the vertical zones intermediate the pebble inlet conduits, results in a greater mass of pebbles being provided at higher temperatures for contact with the greater portion of the gaseous material flowing upwardly through the reaction chamber. Thus, fewer pebbles per unit time gravitate through the vertical zone below the pebble throats for contact with the lesser quantities of gas which flow through those zones and more pebbles per unit time flow through the vertical zones through which the greater quantities of gas flow. The stagnant beds of pebbles behind the baffles in the lower end portion of the chamber soon attain the temperature of the feed gas. Adjustment of the baffles can be made by measurement and calibration in accordance with (1) product or effluent analysis, (2) gaseous effluent temperature or (3) pebble outlet temperature.

Figure 2:
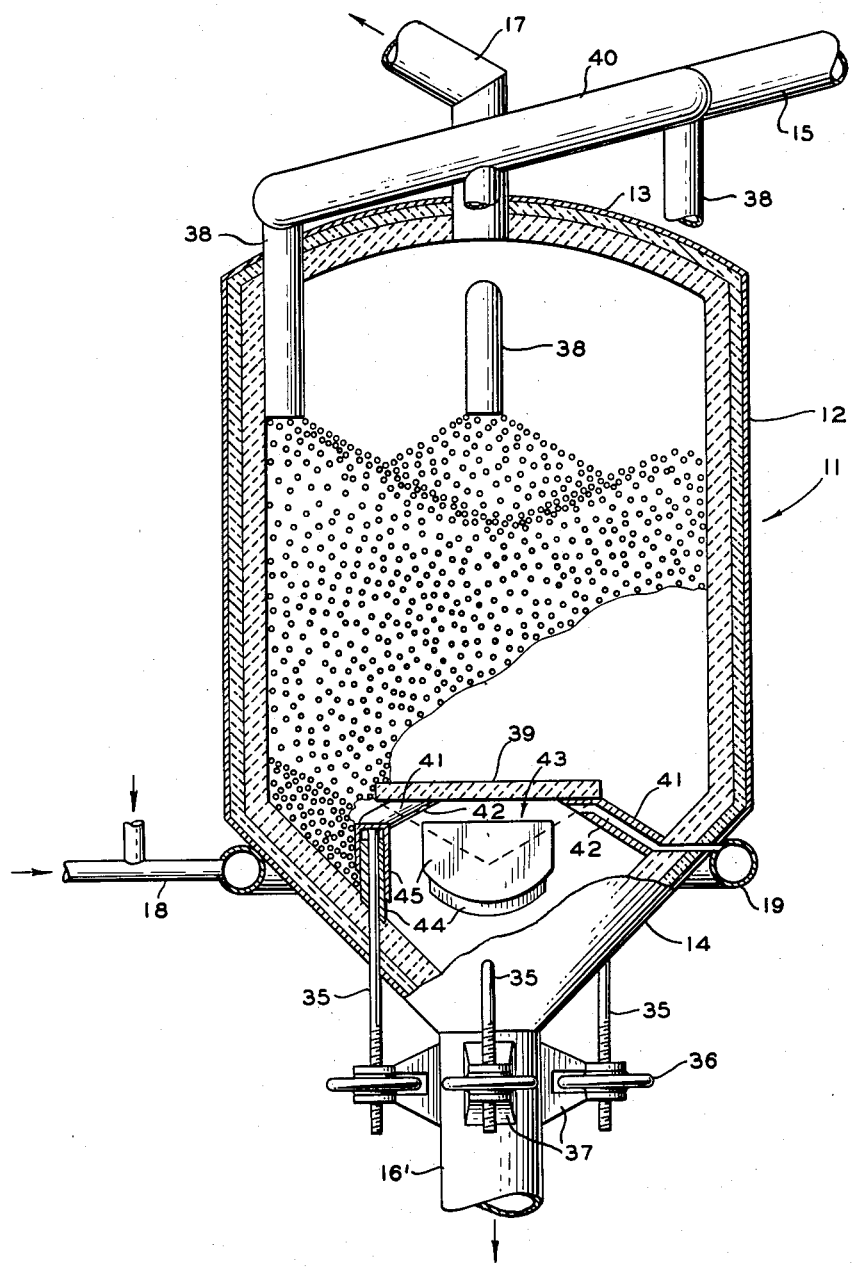
Figure 2 is a sectional view of a pebble heat exchange chamber embodying this invention, the section being taken along the line 2—2 of Figure 3.

Referring particularly to the device shown in Figure 2 of the drawings, parts like those described in connection with Figure 1 are designated by like numerals. As pointed out above, parts shown in Figures 1 and 2 are interchangeable and for the purpose of simplicity are shown only in one figure. Inlet conduit 15 is connected to a header member or surge chamber 40 which is in turn connected to the upper end of chamber 11 by means of a plurality of inlet conduits 38. Gaseous effluent conduit 17 extends upwardly from the upper end of chamber 11, being centrally positioned in the chamber shown in this figure. Pebble outlet conduit 16' extends downwardly from the lower end of chamber 11. Baffle member 39 is provided in the lower portion of chamber 11 and is spaced above outlet conduit 16' by means of conduit and support members 41. This baffle is preferably larger in diameter than outlet conduit 16' but is preferably no larger than the imaginary circle upon which baffles 45 are positioned. Conduit-support members 41 extend from header member 19 upwardly to the lower side of baffle member 39 and communicate with the interior of chamber 11 through conduits 42 beneath baffle 39. Upright baffles 43 are positioned intermediate an extension of the vertical axis of inlet conduits 38 and the vertical axis of conduit 16'. As pointed out above, the width of each baffle 43 is preferably in substantial conformance with the equation $$\frac{C}{2n}$$

where "C" is the circumference of the circle upon which the baffles are positioned intermediate the inlet and outlet conduits and "n" is the number of pebble inlet conduits. In one form, baffle members 43 comprise a central core 44 which is rigidly connected to the lower end of chamber 11 and has an opening therethrough to permit the extension of a drive member 35 therethrough. Drive members 35 are connected to sleeve members 45, sleeve members 45 being hollowed in a portion thereof so as to fit over guide members 44. Guide members 44 are of such shape as to prevent sleeve members 45 from turning about their axes. Sleeve members 45 are raised or lowered in response to the turning of actuator members 36 which are threadedly connected to drive members 35.

Figure 3:
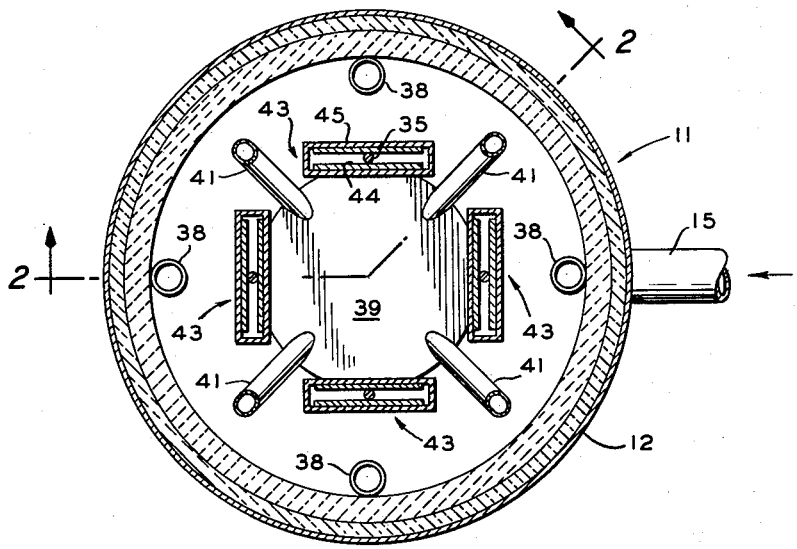
Figure 3 is a horizontal cross section taken along the line 3—3 of Figure 1.
Figure 4A:
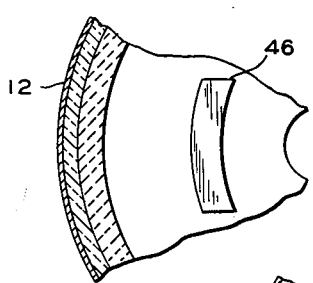
Figure 4A is a broken section showing a modification of this invention.
Figure 4B:
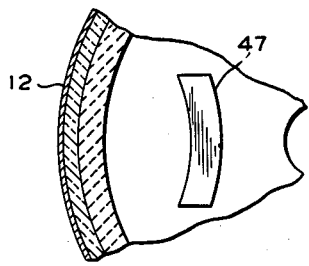
Figure 4B is a broken section showing another modification of this invention.
Figure 4C:
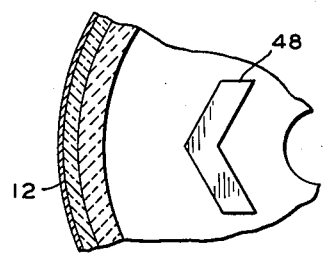
Figure 4C is a broken section showing another modification of this invention.

Better understanding of the positioning of the baffle members with respect to the pebble inlet conduits will be obtained upon reference to Figure 3 of the drawings. Although sleeve members 45 are shown in Figure 3 to be rectangular type baffles, these baffles may be in any shape such as convex members 46 shown in Figure 4A of the drawings, concave members 47 shown in Figure 4B of the drawings, or angular type members 48 as shown in Figure 4C of the drawings, all of which have a width extending generally tangentially to a circle coaxial with the chamber.

Various modifications of this invention will be apparent to those skilled in the art upon study of the accompanying disclosure. Such modifications are believed to be within the spirit and the scope of this invention.

I claim:

1. An improved pebble heat exchange chamber comprising in combination a closed, elongated, upright shell; pebble inlet conduits in the upper end of and adjacent the side wall of said shell; gaseous effluent outlet means in the upper end portion of said shell; a central pebble outlet in the lower end of said shell; a baffle transversely disposed in the chamber formed within said shell and spaced above said pebble outlet so as to permit the flow of pebbles therearound; gaseous material conduits extending upwardly from the lower end of said shell to the lower side of the said baffle as support members therefor and being open to the chamber below said baffle; and an upright baffle section extending upwardly from the bottom of said shell below said transverse baffle and positioned intermediate the axis of each said pebble inlet and the axis of said pebble outlet conduit.

2. The pebble heat exchange chamber of claim 1 wherein each said baffle section is of a width along the hereinafter-named circle corresponding to the formula $$\frac{C}{2n}$$

where "C" is the circumference of a circle upon which the baffle section is positioned and "n" is the number of pebble inlet conduits.

3. The pebble heat exchange chamber of claim 2 wherein each said baffle section comprises a guide member disposed at the lower end of said shell intermediate the axis of each said pebble inlet conduit and the axis of said pebble outlet conduit, and a sleeve member hollowed in its lower end portion so as to fit closely over said guide member; and drive means extending through the bottom of said shell, through each said guide member and attached to said sleeve member so as to displace said sleeve member in a vertical direction.

4. The pebble heat exchange chamber of claim 3, wherein each said baffle section is convex as opposing the direction of pebble flow.

5. The pebble heat exchange chamber of claim 3 wherein each said baffle section is concave as opposing the direction of pebble flow.

6. The pebble heat exchange chamber of claim 3 wherein each said baffle section is angular with its apex most remote from the axis of the chamber.

7. The pebble heat exchange chamber of claim 3 wherein each said baffle section is rectangular.

8. An improved pebble heat exchange chamber comprising in combination a closed, elongated, upright shell; pebble inlet conduits in the upper end of and adjacent the side wall of said shell; gaseous effluent outlet means in the upper end portion of said shell; a central pebble outlet in the lower end of said shell; a baffle transversely disposed in the chamber formed within said shell and spaced above said pebble outlet so as to permit the flow of pebbles therearound; gaseous material inlet means in the lower end portion of said shell; and an upright baffle section extending upwardly from the bottom of said shell below said transverse baffle and positioned intermediate the axis of each said pebble inlet and the axis of said pebble outlet conduit.

9. The pebble heat exchanger of claim 8 wherein each said baffle section is of a width along the hereinafter-named circle corresponding to the formula $$\frac{C}{2n}$$

where "C" is the circumference of a circle upon which the baffle section is positioned and "n" is the number of pebble inlet conduits.

10. The pebble heat exchanger of claim 8 wherein each said baffle section comprises a guide member disposed at the lower end of said shell intermediate the axis of each said pebble inlet conduit and the axis of said pebble outlet conduit, and a sleeve member hollowed in its lower end portion so as to fit closely over said guide member; and drive means extending through the bottom of said shell, through each said guide member and attached to said sleeve member so as to displace said sleeve member in a vertical direction.

References Cited in the file of this patent

UNITED STATES PATENTS

| | | |
|---|---|---|
| 2,554,435 | Weber | May 22, 1951 |
| 2,582,116 | Goins | Jan. 8, 1952 |